US009541324B2

(12) United States Patent
Stark (10) Patent No.: US 9,541,324 B2
(45) Date of Patent: Jan. 10, 2017

(54) LOW TEMPERATURE COOLING AND DEHUMIDIFICATION DEVICE WITH REVERSING AIRFLOW DEFROST FOR DEHUMIDIFICATION AND WATER GENERATION APPLICATIONS WHERE COOLING COIL INLET AIR IS ABOVE FREEZING (71) Applicant: Walter Stark, Centerport, NY (US)

(72) Inventor: Walter Stark, Centerport, NY (US)

( * ) Notice: Subject to any disclaimer, the term of this patent is extended or adjusted under 35 U.S.C. 154(b) by 308 days.

(21) Appl. No.: 14/299,647

(22) Filed: Jun. 9, 2014

(65) Prior Publication Data
US 2015/0082817 A1 Mar. 26, 2015

Related U.S. Application Data (63) Continuation-in-part of application No. 14/034,896, filed on Sep. 24, 2013, now Pat. No. 9,200,829.

(51) Int. Cl.
*F25D 21/12* (2006.01)
*F24F 12/00* (2006.01)
*F24F 11/00* (2006.01)

(52) U.S. Cl.
CPC ........... *F25D 21/125* (2013.01); *F24F 12/001* (2013.01); *F24F 2011/0087* (2013.01); *F24F 2012/008* (2013.01); *Y02B 30/563* (2013.01)

(58) Field of Classification Search
CPC ........ F25D 21/04; F25B 270/21; F25C 240/20
USPC ....................... 62/92, 93, 271, 272, 187, 406
See application file for complete search history.

(56) References Cited

U.S. PATENT DOCUMENTS

| 2,481,348 | A |   | 9/1949  | Ringquist et al. |
|-----------|---|---|---------|------------------|
| 3,257,816 | A |   | 6/1966  | Parce            |
| 3,572,052 | A |   | 3/1971  | Toth             |
| 3,990,260 | A |   | 11/1976 | Eustis           |
| 5,369,964 | A | * | 12/1994 | Mauer ............ F24F 3/1405 165/104.17 |
| 5,553,462 | A |   | 9/1996  | Taylor           |
| 5,694,782 | A |   | 12/1997 | Alsenz           |
| 5,816,315 | A | * | 10/1998 | Stark ............. F24F 3/1405 165/166 |
| 5,890,368 | A |   | 4/1999  | Lakdawala        |

(Continued)

FOREIGN PATENT DOCUMENTS

AU  2012321841 A1  11/2010
CA  1301739 B1  8/1988
(Continued)

*Primary Examiner* — Melvin Jones
(74) *Attorney, Agent, or Firm* — Alfred M Walker (57) ABSTRACT

A low temperature cooling and dehumidification system uses a reverse airflow arrangement to defrost a frosted cooling coil while not interrupting operation. Automatic air dampers are used to reverse the airflow at the proper time to initiate defrost of that section of frosted cooling coil. This system is useful for low temperature cooling and dehumidification in situations where the inlet air is above freezing, however exiting air below freezing can be supplied if desired. It is advantageous for operation if the coolant flow and temperature internal to the cooling coil are regulated to create the conditions for frost formation to begin closer to the air leaving side of the active cooling coil. The dehumidified generated condensate can be collected and used as grey water and/or potable water.

21 Claims, 12 Drawing Sheets

A CIRCUIT FLOW (56) References Cited

U.S. PATENT DOCUMENTS

| | | | |
|---|---|---|---|
| 6,021,644 A | 2/2000 | Ares et al. | |
| 6,082,125 A | 7/2000 | Savtchenko | |
| 6,427,454 B1 | 8/2002 | West | |
| 7,581,408 B2 * | 9/2009 | Stark | F24F 3/153 62/93 |
| 8,316,660 B2 | 11/2012 | DeMonte et al. | |
| 2005/0091993 A1 | 5/2005 | Paradis | |
| 2006/0172676 A1 | 8/2006 | Ebner et al. | |
| 2013/0055735 A1 | 3/2013 | DeMonte et al. | |

FOREIGN PATENT DOCUMENTS

| | | |
|---|---|---|
| CN | 102645080 A | 8/2012 |
| CN | 202582032 A1 | 12/2012 |
| GB | 1301127 A1 | 12/1972 |
| JP | 62023810 A1 | 1/1987 |
| JP | 62066032 A1 | 3/1987 |
| JP | 07000751 A1 | 6/1995 |
| WO | 2009011628 A1 | 1/2009 |
| WO | 2011063199 A3 | 5/2011 |

\* cited by examiner

FIG. 1
FINNED - TUBE
COOLING COIL

FIGURE 1A
SINGLE TWO-PASS COIL
NO HEAT EXCHANGER

FIGURE 1B
SINGLE ONE-PASS COIL
NO HEAT EXCHANGER

FIGURE 2
MULTIPLE ONE-PASS COILS
NO HEAT EXCHANGER

FIGURE 3
SINGLE TWO-PASS COIL
MULTIPLE HEAT EXCHANGERS

FIGURE 4
MULTIPLE ONE-PASS COILS
MULTIPLE HEAT EXCHANGERS

FIGURE 5A
SINGLE TWO-PASS COIL
SINGLE HEAT EXCHANGER

FIGURE 5B
SINGLE ONE-PASS COIL
SINGLE HEAT EXCHANGER

FIGURE 6
MULTIPLE ONE-PASS COILS
SINGLE HEAT EXCHANGER

← TOP VIEWS →

FIGURE 7A
A-CIRCUIT FLOW

FIGURE 7A3

← SIDE VIEWS →

← TOP VIEWS →

FIGURE 7B
B-CIRCUIT FLOW

FIGURE 7B3

← SIDE VIEWS →

FIGURE 8A
A-CIRCUIT
FLOW

FIGURE 8B
B-CIRCUIT
FLOW

FIGURE 11
A CIRCUIT FLOW

FIG. 11A
A CIRCUIT FLOW

FIGURE 12
B CIRCUIT FLOW

LOW TEMPERATURE COOLING AND DEHUMIDIFICATION DEVICE WITH REVERSING AIRFLOW DEFROST FOR DEHUMIDIFICATION AND WATER GENERATION APPLICATIONS WHERE COOLING COIL INLET AIR IS ABOVE FREEZING

FIELD OF THE INVENTION

The present invention relates to using reverse airflow defrost in low temperature cooling and dehumidification systems, where inlet air is above freezing.

BACKGROUND OF THE INVENTION

Low temperature air cooling is needed to maintain low dew point temperatures in spaces such as hospital operating rooms, archival storage, indoor ice rinks, supermarkets etc. Mechanical cooling and dehumidification systems are generally restricted to delivering air temperatures safely above freezing to avoid complications associated with frost buildup in the cooling coil and subsequent air restriction.

Cooling coils typically comprise tubes, through which flows a coolant such as water, brine or a refrigerant. The inner surface of the tubes can have enhancements to improve heat transfer between the coolant and the tube. Air, flows over the outside of the tubes where fins can be added to enhance heat transfer between the tube and air. The coolant inside the tubes removes heat from the air and thus cools the air.

Frost formation begins during operation when coolant temperature is below freezing and air temperature reaches saturation. Frost accumulates over time and eventually restricts airflow, requiring some means for defrosting.

Defrosting may employ introduction of hot gas, from a refrigeration plant, injected into the tubes, thereby defrosting from the inside out. This introduction of heat to a cooling process interrupts operation and is inefficient, resulting in an increase in overall energy consumption.

SUMMARY OF THE INVENTION

This invention uses a reverse airflow arrangement to defrost. Cooling coil airflow is reversed, and the coldest section of the cooling coil becomes the warmest, thereby promoting defrost, while also keeping the energy given up by melting frost, in the air stream. This provides an energy efficient means for defrosting while not interrupting operation. Note that only airflow internal to the dehumidification system is reversed while that of the input and output ducts flows uninterrupted.

Figure 1:
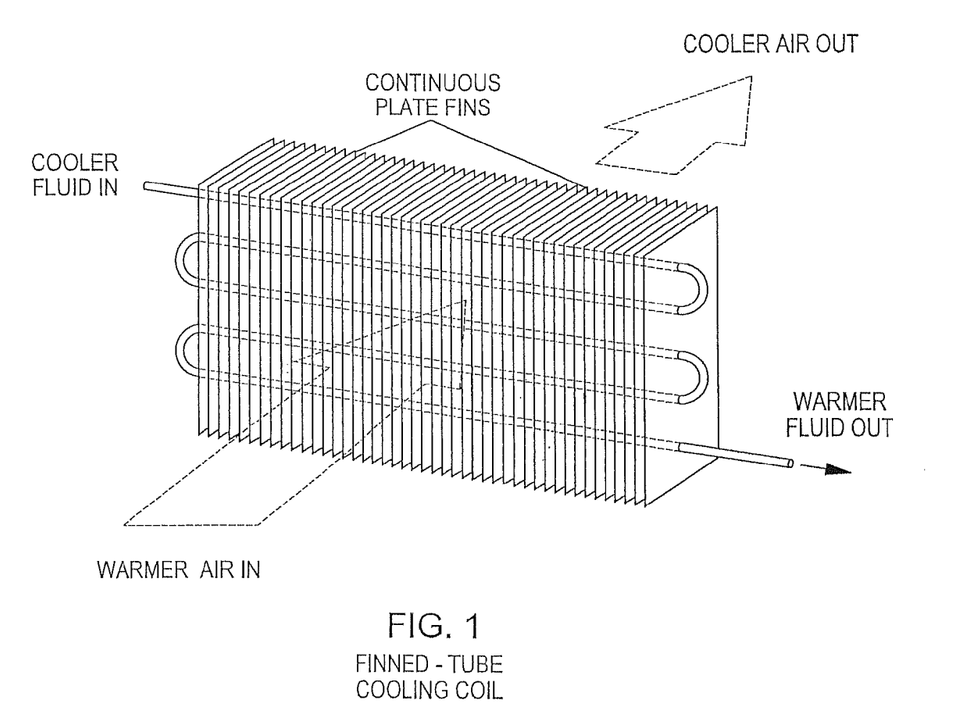
FIG. 1 shows two perspective views of a typical cooling coil as used in the prior art as well as in this invention; both a schematic view showing airflow pattern as well as pictorial view of a cooling coil in a horizontal position are shown.
Figure 1A:
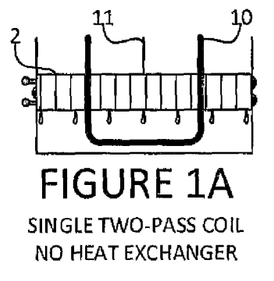
FIG. 1A depicts a two-pass single cooling coil arrangement.
Figure 3:
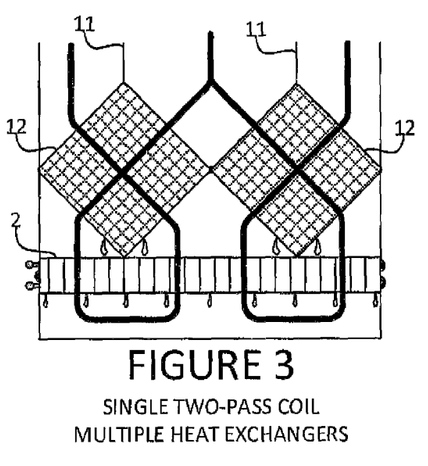
FIG. 3 depicts a two-pass single cooling coil arrangement with multiple heat exchangers.
Figure 4:
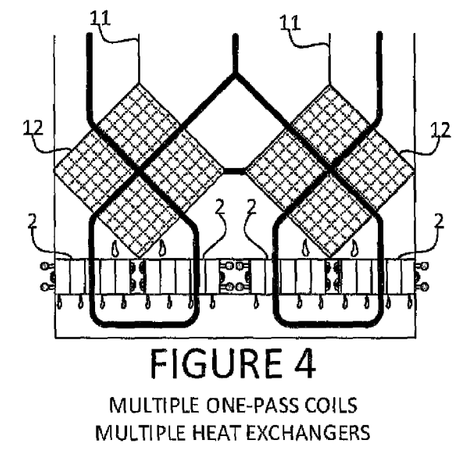
FIG. 4 depicts a two-pass multiple cooling coil arrangement with multiple heat exchangers.
Figure 5A:
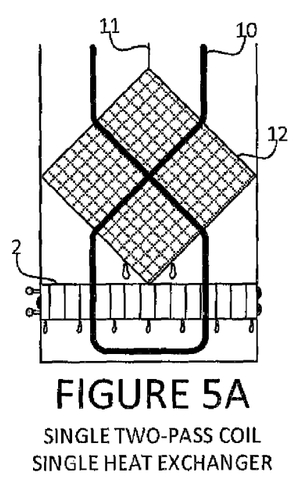
FIG. 5A depicts a two-pass single cooling coil arrangement with a single heat exchanger.
Figure 5B:
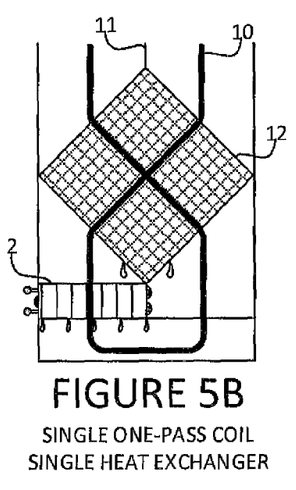
FIG. 5B depicts a one-pass single cooling coil arrangement with a single heat exchanger.
Figure 6:
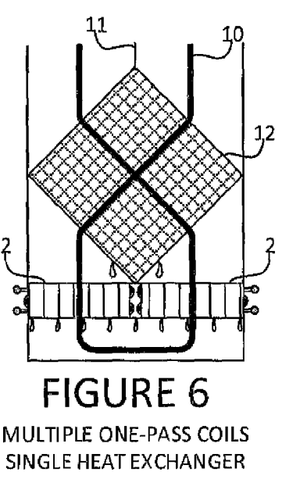
FIG. 6 depicts a two-pass dual cooling coil arrangement with a single heat exchanger.

In a first embodiment of the invention, a single two-pass cooling coil is used (see FIGS. 1A, 3 and 5A). Warmer air, entering the first pass of this cooling coil arrangement, is least vulnerable to frosting. Coolant flow and temperature is regulated so that frost begins largely in the second pass of the cooling coil. When the frost threshold is reached, airflow through the cooling coil is reversed, and frost is now exposed to warmer entering air, giving up its heat to the air stream and defrosting the cooling coil. Meanwhile, new frost begins to form on the former first pass (now second pass) of the cooling coil. While other methods of determining frost threshold may be used, as known to those skilled in the HVAC art, the method of determining the frost threshold preferably involves measuring the pressure drop across the frosting coil and reversing operation after it reaches a predetermined level.

In a second embodiment of the invention, multiple one-pass cooling coils are used (see FIGS. 1B, 2, 4, 5B and 6A). In this embodiment, one cooling coil is active, while the other is defrosting. This option offers the ability to control to lower dew point temperatures because the active cooling coil may operate at low temperatures while the defrosting cooling coil can be inactive or operating at diminished capacity. When the frost threshold is reached, airflow through the cooling coil is reversed, coolant flow to the defrosting cooling coil is inactive or diminished, coolant flow to the defrosted cooling coil is active, and frost is now exposed to warmer entering air, giving up its heat to the air stream and defrosting the cooling coil. Meanwhile, new frost begins to form on the defrosted and active cooling coil.

A manifold assembly employing dampers (Ai, Bi, Ao and Bo) to reverse air flow through a cooling coil without interrupting operation. Damper designation is "A" or "B" to designate flow path and "i" or "o" to designate inlet or outlet air damper. The dampers change positions to reverse the airflow across the cooling coil so that frost near the former outlet (now inlet) section can defrost, while frost can accumulate on the former inlet (now outlet) section. Flow reversal is also designated by UP and DN (down) in the illustrations. Airflow through the device, is fixed in one direction. Irrespective of the direction of airflow through the cooling coil, the external geometric path of the airflow through the device remains constant.

Therefore a device is provided for cooling and dehumidifying an air stream to temperatures at or below freezing, while avoiding air restriction due to frost buildup in one or more one cooling coils, where cooling coil inlet air is above freezing. The device includes at least two opposing inlet air dampers at the device air inlet and at least two opposing outlet air dampers at the device air outlet.

The device further includes two airflow circuits, where at least one inlet damper is in airflow communication with at least one outlet damper, through at least one cooling coil and by alternating the dampers in each of two airflow circuits, so that reversal of airflow occurs through said the one or more cooling coils, routing warmer inlet air to the previously cold outlet of the one or more cooling coils, while maintaining airflow in one direction through said device.

Optionally the device can include one or more air-to-air heat exchangers for exchanging energy between the colder air leaving the one or more cooling coils and the relatively warmer air entering the one or more one cooling coils in each of the aforementioned airflow circuits.

In general, the present invention limits frost formation in a low temperature cooling and dehumidification system by passing ambient air through a containment in which there is a cooling coil array comprising a coil through which flows a coolant for cooling and dehumidifying the ambient air whereby a condensate is formed on an outside surface of the coil, where condensate freezes to form a frost formation where the coldest air meets the coldest portion of the coil. The ambient air makes a first pass through an air-to-air heat exchanger located within the containment located above the coil array and a second pass through the heat exchanger after leaving the coil array. The frost thus formed on the coil is periodically removed by reversing direction of air flow through the containment, whereby the reversal of air flow recurs without interrupting cooling and dehumidification or changing direction of flow into and out of the containment.

The water condensate generated and formed is collected in a plenum under the array within the containment.

Any of the dehumidification configurations of this invention produce condensate as a byproduct of normal operation. This generated condensate can be collected in lieu of being drained to a sewer. In some venues, this may be considered a useful commodity commonly called grey water. It can be used as is for plant irrigation, waste flushing, outdoor ground washing, etc. By providing the proper piping and a storage tank, these dehumidification systems can be a reliable source of grey water. If the water thus generated and collected meets drinking water standards, it can be used as potable water if the grey water produced is optionally further treated if required after testing, it can also be used as a ready supply of potable water.

BRIEF DESCRIPTION OF DRAWINGS

The present invention can best be understood in connection with the accompanying drawings. It is noted that the invention is not limited to the precise embodiments shown in drawings, in which:

FIGS. 1A through 6 depict cooling coil arrangements in relation to systems with and without heat exchangers, where flow direction is reversible and therefore direction is not shown;

FIGS. 7A & 7B is a series of drawings that depict both A and B circuit airflow through the device, with damper positioning to achieve each where the generic device is shown without heat exchangers and with a single two-pass cooling coil, and wherein one pass cooling coil is also possible as is multiple cooling coils, shown in FIGS. 1-2;

FIGS. 7A1 and 7A2 are top views projected from the side view below and showing Circuit-A air entering at damper Ai, and continuing down through the cooling coil and then up, exiting at damper Ao, thereby creating a flow direction through the cooling coil defined by Circuit A;

FIGS. 7A3 and 7A4 are views from two sides of the device showing Circuit-A air entering damper Ai and continuing (solid line) through the cooling coil and turning upward (dotted line), leaving damper Ao thereby creating a flow direction through the cooling coil defined by Circuit A;

FIGS. 7B1 and 7B2 are top views projected from the side view below and showing Circuit-B air entering at damper Bi, and continuing down through the cooling coil and then up, exiting at damper Bo thereby creating a flow direction through the cooling coil defined by Circuit B;

FIGS. 7B3 and 7B4 are views from two sides of the device showing Circuit-B air entering damper Bi and continuing (dotted line) through the cooling coil and turning upward (solid line), leaving damper Bo thereby creating a flow direction through the cooling coil defined by Circuit B;

FIGS. 8A & 8B is a series of drawings that depict both A and B circuit airflow through the device, with damper positioning to achieve each, wherein the generic device is shown with heat exchangers and with a single two-pass cooling coil, and wherein one pass cooling coil is also possible as is multiple cooling coils, shown in FIGS. 3-6;

FIGS. 8A1 and 8A2 are top views projected from the side view below and showing Circuit A air entering at damper Ai, and continuing down through the cooling coil and then up, exiting at damper Ao thereby creating a flow direction through the cooling coil defined by Circuit A;

FIGS. 8A3 and 8A4 are views from two sides of the device showing Circuit-A air entering damper Ai and continuing (solid line) through the heat exchanger and cooling coil and then turning upward (dotted line), leaving damper Ao thereby creating a flow direction through the cooling coil defined by Circuit A;

FIGS. 8B1 and 8B2 are top views projected from the side view below and showing Circuit B air entering at damper Bi, and continuing down through the cooling coil and then up, exiting at damper Bo thereby creating a flow direction through the cooling coil defined by Circuit B;

FIGS. 8B3 and 8B4 are views from two sides of the device showing Circuit-B air entering damper Bi and continuing (dotted line) through the heat exchanger and cooling coil and then turning upward (solid line), leaving damper Bo thereby creating a flow direction through the cooling coil defined by Circuit B;

FIG. 14 is a schematic side elevation of FIG. 5A with the addition of an integral grey water collection tank;

FIG. 15 is a side elevation of FIG. 8B4 with the addition of an integral grey water collection tank; and, FIG. 16 is a block diagram depicting the grey water storage tank followed by a water treatment module to optionally treat the grey water, if required after testing, to also produce potable water.

DETAILED DESCRIPTION OF THE INVENTION

The device of this invention uses a reverse airflow arrangement to defrost a frosted cooling coil while not interrupting operation. Automatic air dampers are used to reverse the airflow when the defrost threshold is reached. Any type of serviceable damper such as a swing damper or a louvered damper can be used. This system is useful for low temperature cooling and dehumidification in situations where the cooling coil inlet air is above freezing, however exiting air below freezing can be supplied if desired. It is advantageous for operation if the coolant flow and temperature internal to the cooling coil are regulated to create the conditions for frost formation to begin closer to the air leaving side of the active cooling coil, and to regulate the rate of frost buildup to be consistent with the rate of defrosting.

FIG. 1 shows a schematic representation 1 of a typical cooling coil illustrating airflow through the cooling coil. Also shown in FIG. 1 is a perspective view of cooling coil 2 in a horizontal position.

Figure 1B:
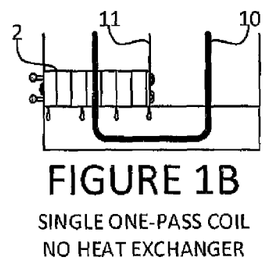
FIG. 1B depicts a one-pass single cooling coil arrangement.
Figure 2:
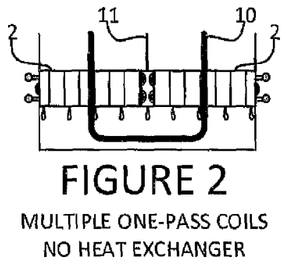
FIG. 2 depicts a two-pass dual cooling coil arrangement.

A wide variety of cooling coil arrangements compatible with this invention is shown in FIGS. 1A through 6. Both single-pass as well as two-pass systems with and without heat exchangers are shown. Airflow 10 is shown as a bold line or lines in this group of Figures. FIG. 1A shows a two-pass system using a single cooling coil 2 and no heat exchanger. An airflow partition 11 is used to separate inlet from outlet flows. FIGS. 1B and 2 show other variations without heat exchangers as described in the aforementioned Brief Description of the Drawings. FIGS. 3 through 6 depict arrangements with heat exchangers 12. It is noted that four separate cooling coils 2 and two heat exchangers 12 are shown in a two-pass configuration in FIG. 4.

Figure 7A:
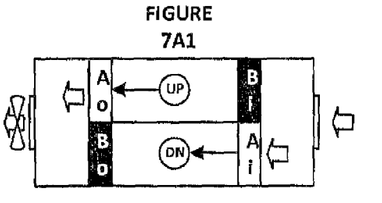
Figure 7A:
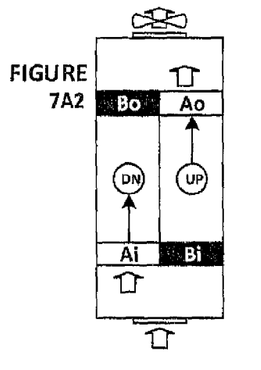
Figure 7A:
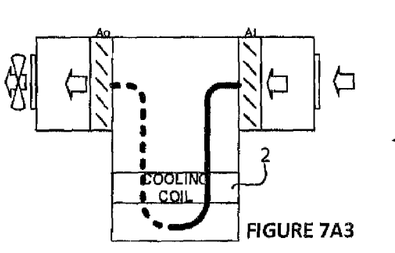
Figure 7A:
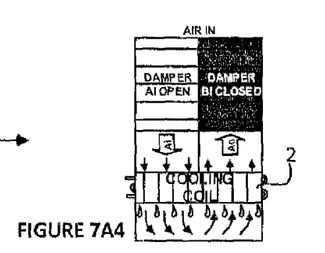
Figure 7B:
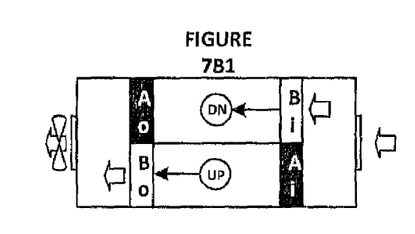
Figure 7B:
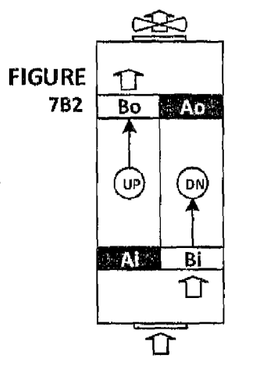
Figure 7B:
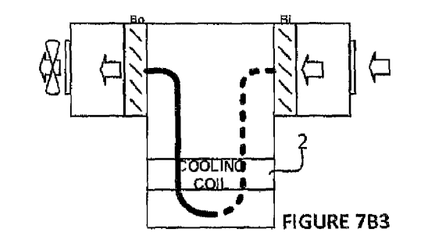
Figure 7B:
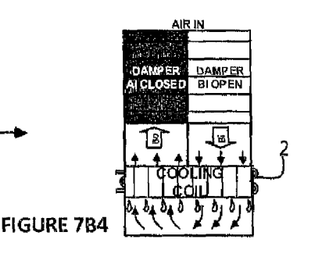
Figure 11:
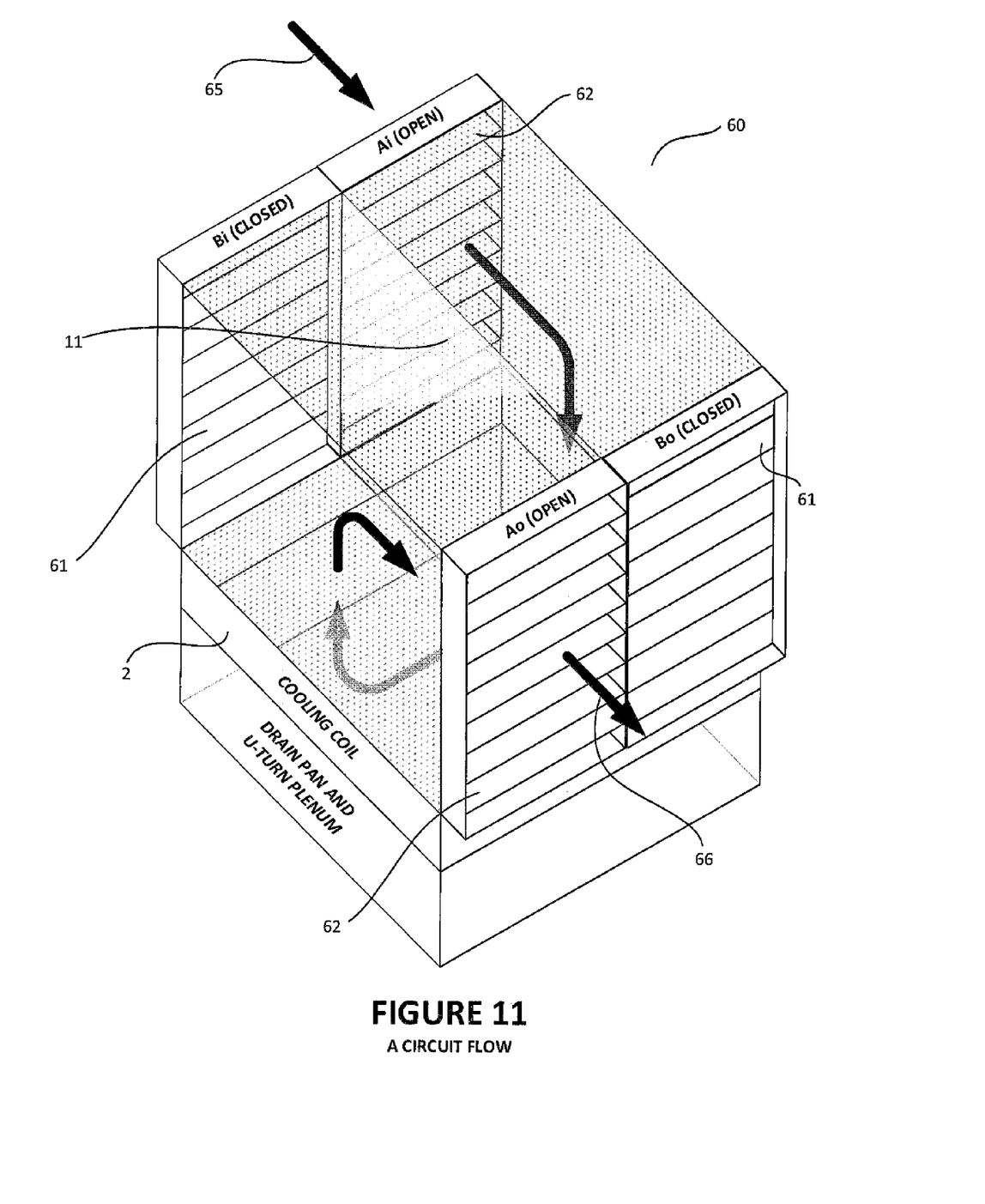
FIG. 11 illustrates the three dimensional airflow internal to circuit A consistent with FIGS. 7A1-7A4.
Figure 12:
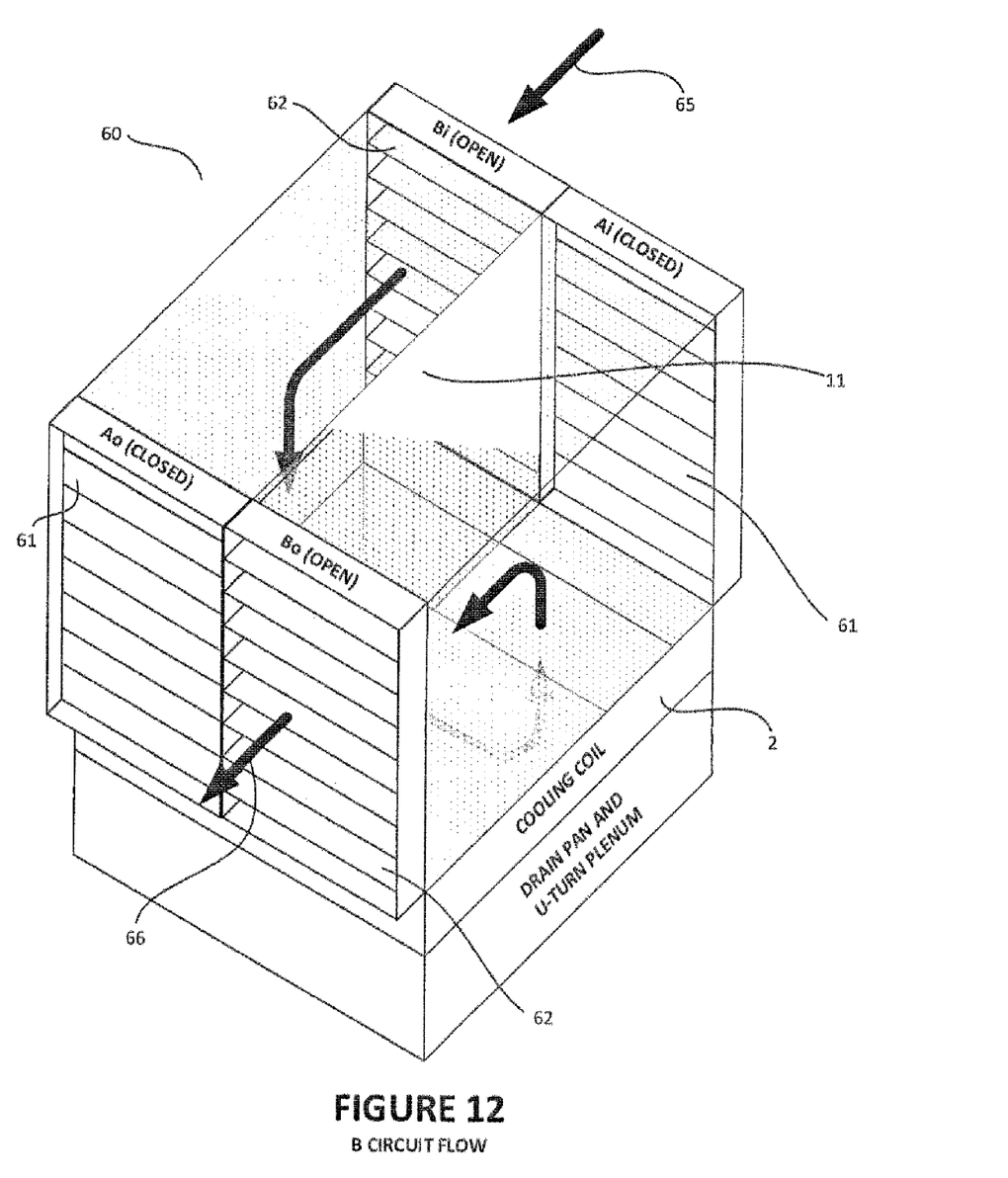
FIG. 12 illustrates the three dimensional airflow internal to circuit B consistent with FIGS. 7B1-7B4.

Flow patterns for configurations without heat exchangers are schematically illustrated for a single direction of airflow in FIGS. 7A1-7A4. FIG. 11 is a three dimensional representation of this airflow. The reverse airflow for the same configuration is shown FIGS. 7B1-7B4, while the three dimensional representation is shown in the configuration of the airflow as shown in FIG. 12. The configurations shown are for a two-pass system in this group of Figures.

In similar fashion, airflow patterns for a two-pass with a heat exchanger are shown in FIGS. 8A1 through 8B4. The specific Figures are explained in the aforementioned Brief Description of the Drawings.

For example, FIGS. 8A & 8B show both A and B circuit airflow through the device, with damper positioning to achieve each. The generic device is shown with heat exchangers and with a single two-pass cooling coil. One pass cooling coil is also possible as is multiple cooling coils, shown in FIGS. 3-6.

Figure 8A:
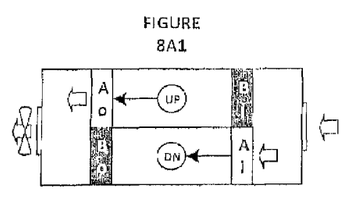
Figure 8A:
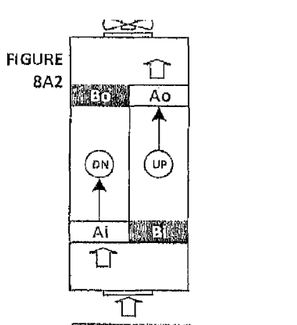
Figure 8A:
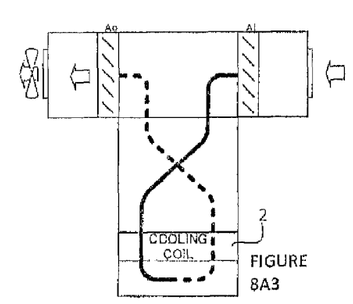
Figure 8A:
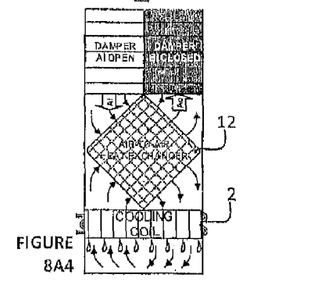
Figure 8B:
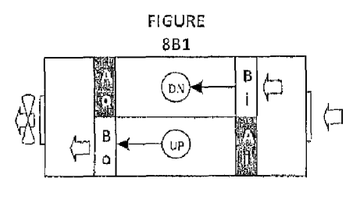
Figure 8B:
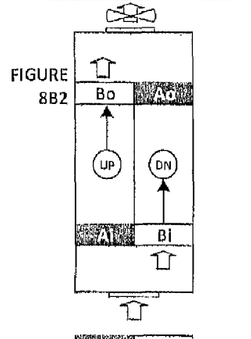
Figure 8B:
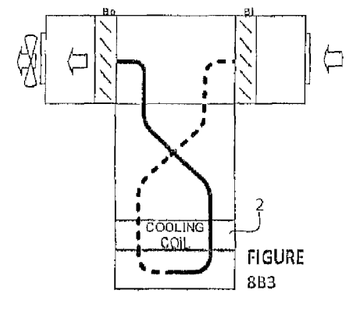
Figure 8B:
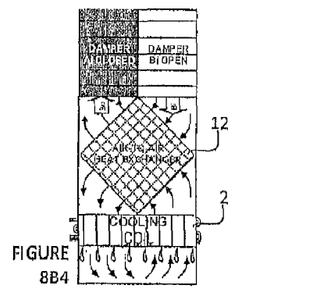
Figure 9:
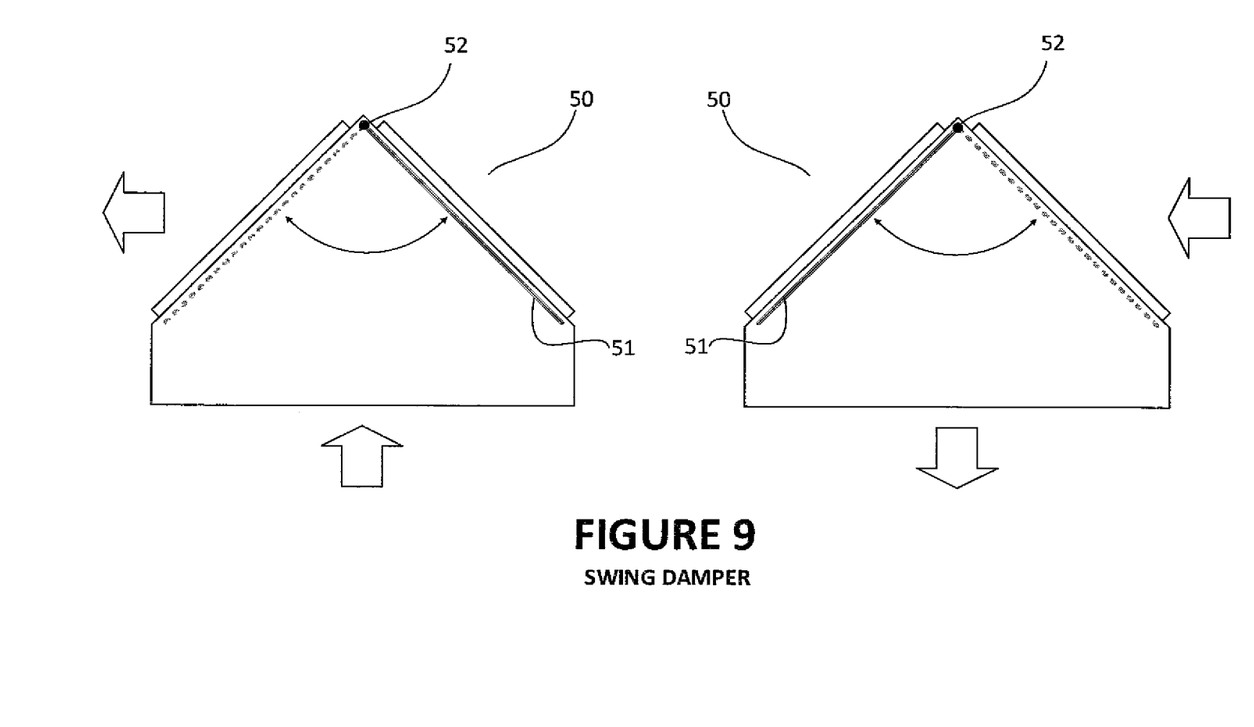
FIG. 9 are views of a possible swing damper option, shown in two positions.

FIGS. 8A1 and 8A2 show Circuit A air entering at damper Ai, and continuing down through the cooling coil and then up, exiting at damper Ao thereby creating a flow direction through the cooling coil defined by Circuit A. FIGS. 8A3 and 8A4 show Circuit-A air entering damper Ai and continuing (solid line) through the heat exchanger and cooling coil and then turning upward (dotted line), leaving damper Ao thereby creating a flow direction through the cooling coil defined by Circuit A FIGS. 8B1 and 8B2 show Circuit B air entering at damper Bi, and continuing down through the cooling coil and then up, exiting at damper Bo thereby creating a flow direction through the cooling coil defined by Circuit B FIGS. 8B3 and 8B4 show Circuit-B air entering damper Bi and continuing (dotted line) through the heat exchanger and cooling coil and then turning upward (solid line), leaving damper Bo thereby creating a flow direction through the cooling coil defined by Circuit B FIG. 9 depicts a swing damper option, shown in two positions. In FIG. 9 are shown two top views of swing damper 50 with damper door 51 which blocks airflow first blocking the right aperture and then the left. Door 51 swings on hinge 52.

Figure 10:
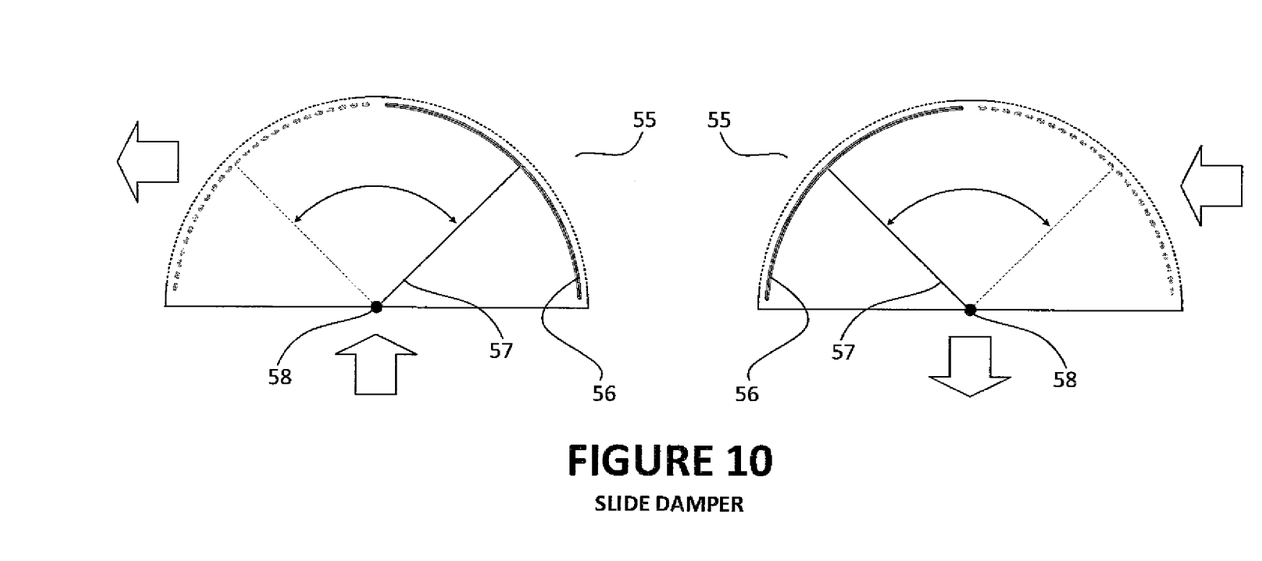
FIG. 10 are views of a possible slide damper option, shown in two positions.

FIG. 10 depicts a slide damper option, shown in two positions. Two top views of slide damper 55 are shown with curved damper door 56 first blocking the right aperture and then the left as it is pivoted on pivots 58 and moved via arms 57.

FIG. 11 shows the flow pattern through circuit A. in a three dimensional airflow internal to circuit A consistent with FIGS. 7A1-7A4. Dehumidifier 60 is shown with inlet airflow 65 moving through and exiting at outlet airflow 66. Louvered dampers 61 (as shown closed) and 62 (as shown open) are used both at the inlet and output ends of dehumidifier 60.

Figure 11A:
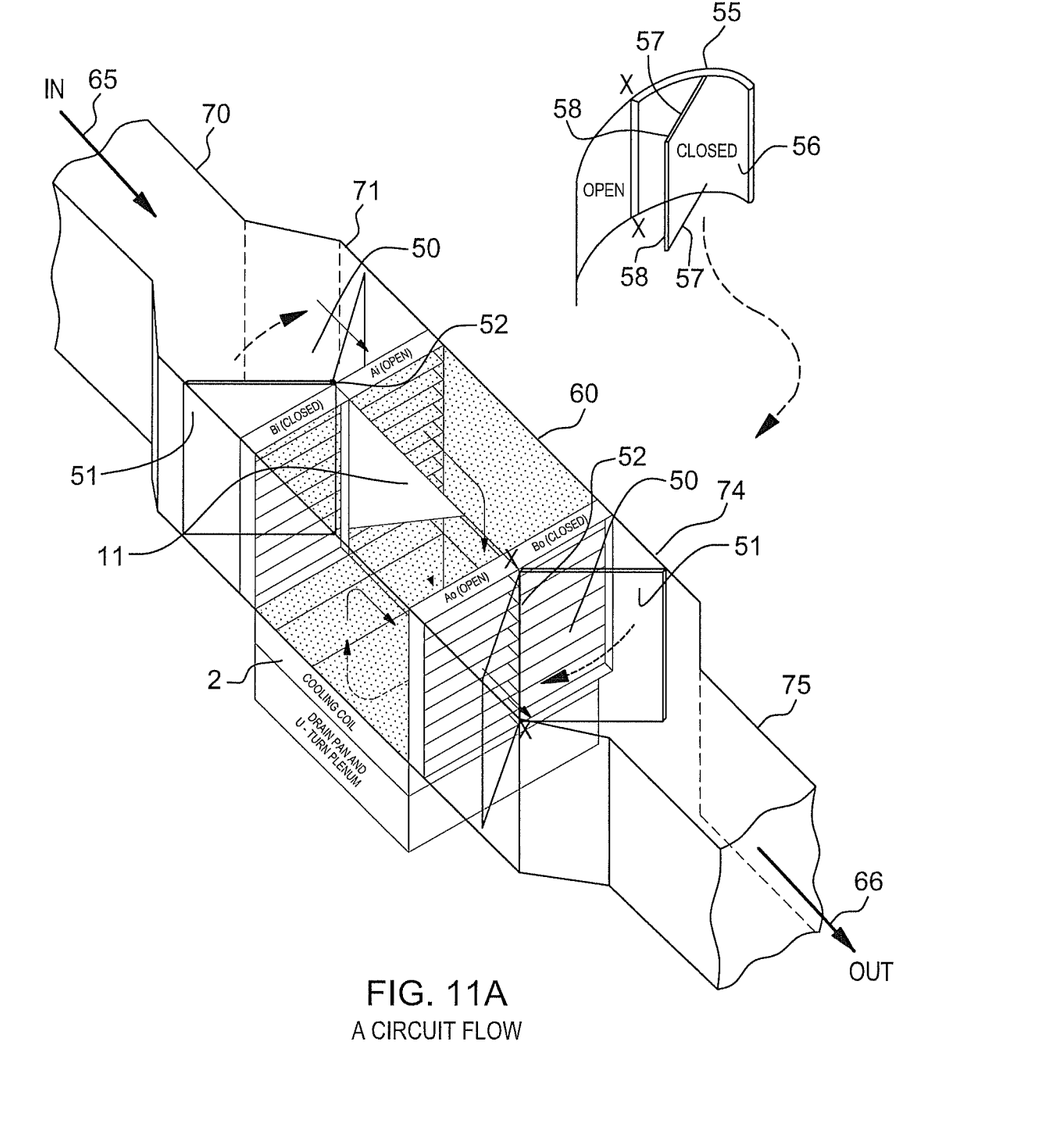
FIG. 11A is an extension of FIG. 11 showing wire-frame depictions of input and output ducts, and also illustrating the use of swing dampers and slide dampers in place of the louver dampers of FIG. 11.

FIG. 11A extends the drawing of FIG. 11 to show the location of the inlet air duct 70, the outlet air duct 75, and the transition areas 71 and 74 which contain the swing dampers 50 here used instead of the louvered dampers of FIG. 11. The apex of dampers 50 are placed at the ends of partition 11 to control the internal air flow in a manner identical to that shown in FIG. 11. In addition, a separate perspective drawing of a slide damper 55 is shown on the side to illustrate its easy substitution for the swing damper 50 at the outlet end; the apex of slide damper 55 is placed at the end of partition 11 at a preferably vertically extending hinge line marked "x-x". Obviously a second slide damper 55 can also be used in lieu of swing damper 50 shown at the input end.

FIG. 12 depicts the flow pattern through circuit B in a three dimensional airflow internal to circuit B consistent with FIGS. 7B1-7B4.

Figure 13:
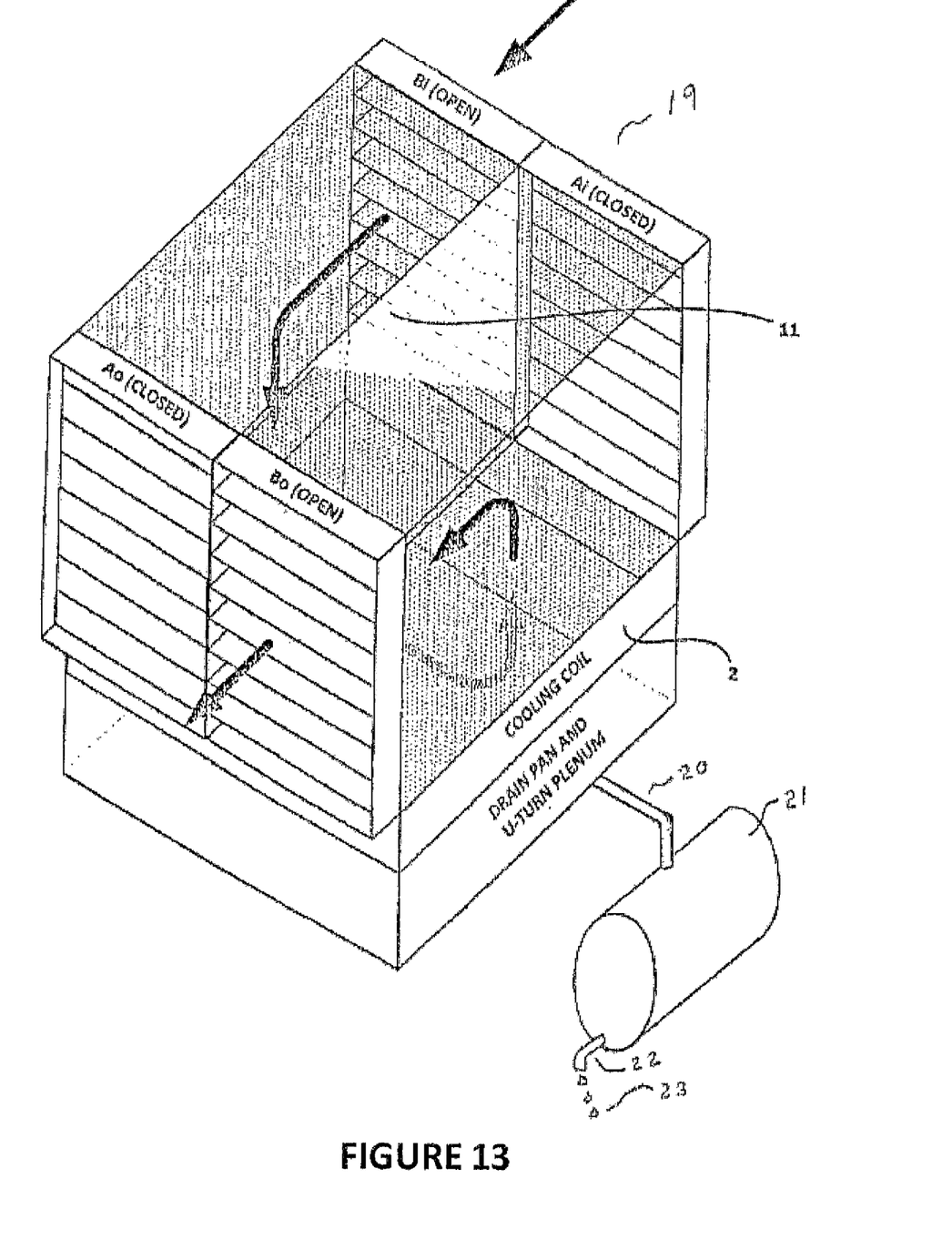
FIG. 13 is a perspective view of the system of FIG. 12 with the addition of external piping and a storage collection tank for grey water.

In FIG. 13 the condensate falling into the drain pan and U-turn plenum is conveyed via condensate pipe 20 into grey water collection tank 21 where its output can be tapped at outlet pipe 22 to yield grey water 23.

Figures 14, 15, 16:
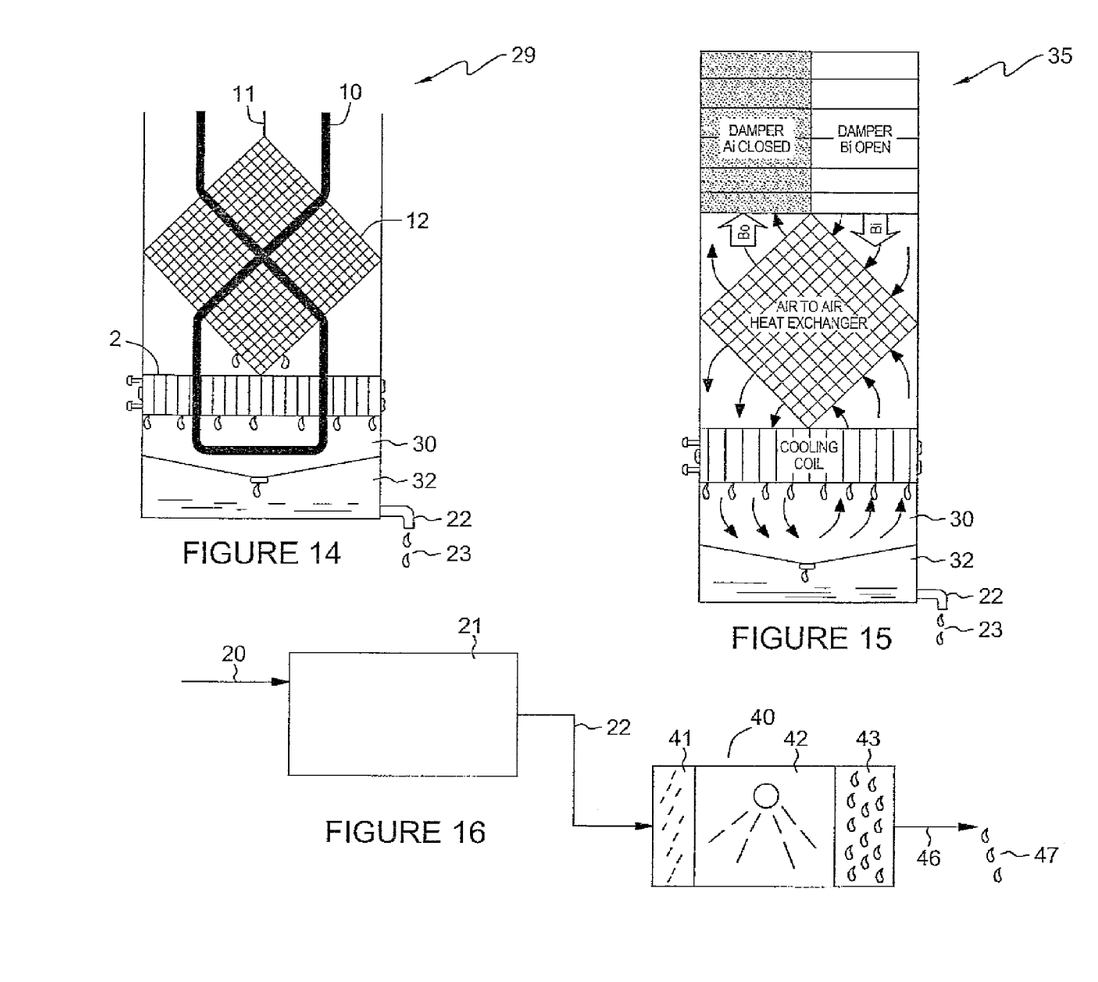

As shown in FIGS. 14 and 15, the grey water storage tank can be built integral to system. In FIG. 14, in system 29 relating to FIG. 5A, condensate falling into drain pan area 30 is guided via an internal drain opening into grey water storage tank 32. In FIG. 15, in system 35 relating to FIG. 8B4, integral tank 32 is shown under drain region 30.

While the water collected in grey water storage tank 32 may be potable without further treatment, FIG. 16 shows the optional conversion of grey water in pipe 22 to potable water 47 by passing it through an optional water treatment module 40 which may have input pre-filter 41, chemical or ozone or UV treatment zone 42, and a final filter 43 which may be an activated carbon bed conveying potable water output through outlet pipe 46.

In this invention, defrost thresholds have been discussed. These are operating points wherein sufficient coil frosting has occurred and air flow has started to be significantly impeded. There are several methods to detect these conditions. Once detected, the air flow is reversed across the two ends of the cooling coil by using air dampers at the input and output ends of the dehumidifier. One type of detector that can be used is a differential pressure sensor placed across the inlet and outlet of each coil 2. Although many such sensors are available on the market, a model SDA-P Intelligent Pressure Transmitter from Vector Controls is exemplary. The threshold selected for the particular installation is then compared to the output of the pressure sensor.

In an alternate implementation, two optical reflective object sensors such as type OPB607A from Optek can be used to optically detect the frost build-up. This type of sensor is intentionally unfocused for sensing diffuse surfaces such as a frosted cooling coil (which would have a different reflectivity from that of an unfrosted coil). One such optical sensor would be strategically placed on either side of partition 11; if either sends a signal detecting frost, the dampers are toggled to the opposite positions to reverse air flow.

Figure 17:
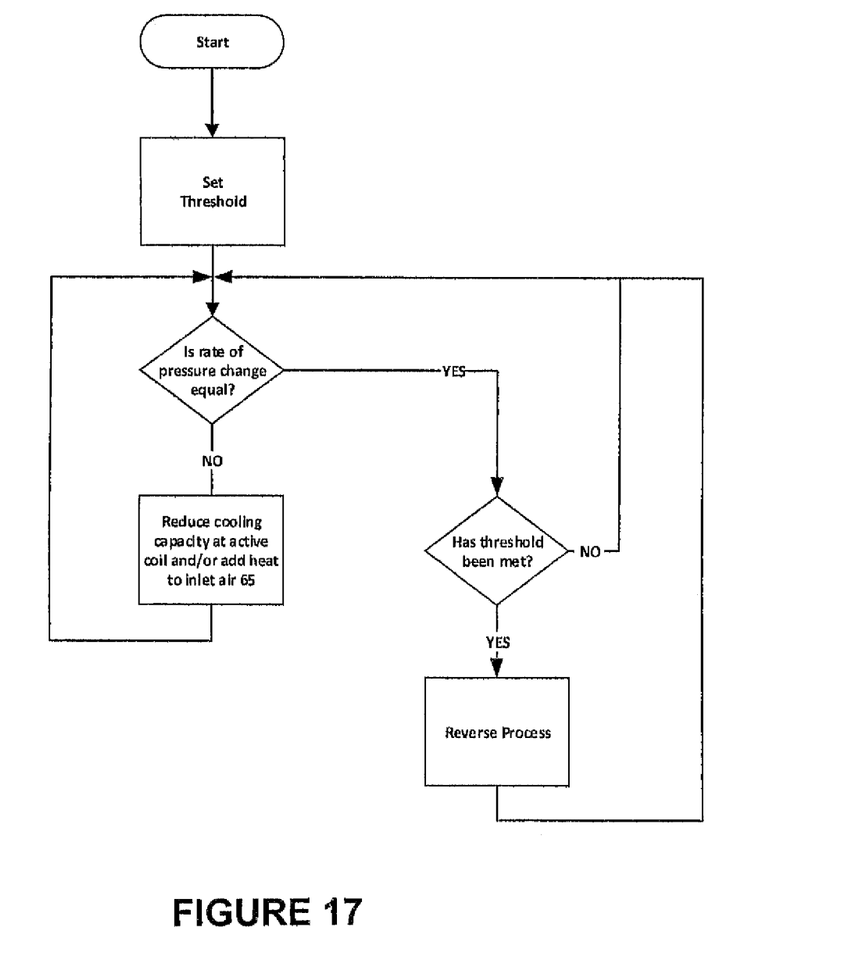
FIG. 17 is a flow chart showing the automated handling of the defrosting operation of this invention.

While the inactive coil is defrosting the rate of frost buildup on the active coil is regulated by regulating coolant flow, so complete defrosting occurs at about the same time as the frost threshold is reached on the active coil and dampers are toggled. The rate of defrost may also be increased by adding heat to inlet air 65. This process is shown in the flow chart of FIG. 17. The heat may be added by any known heaters, but also by capturing heat from compressors and other components during the water collection process. Additionally, as shown in FIG. 11A, while heat can be supplied to inlet air 65 at the inlet duct entry, it can also be supplied anywhere along the path of inlet air within the air flow pattern of the dehumidification containment device 2, in the vicinity of cooling coil 2.

The method of determining the frost threshold preferably involves measuring the pressure drop across the frosting coil and reversing operation after it reaches a predetermined level.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A low temperature cooling and dehumidification system comprising:
    a containment containing a cooling coil array comprising a coil through which flows a coolant;
    an air flow system for directing air through said array for cooling of said air whereby a condensate is formed on an outside surface of said coil;
    means for removal of a frost formation on said coil by reversing direction of air flow through said array without interrupting cooling and dehumidification or changing direction of flow into and out of said containment;
    whereby air flow continues during defrosting; and
    whereby cooling coil airflow is reversed, and the coldest section of the cooling coil becomes the warmest, thereby promoting defrost, while also keeping the energy, given up by melting frost, in the airstream, thereby providing an energy efficient means for defrosting while not interrupting operation; and
    a plenum under said array for collection of generated condensate.

2. The system of claim 1 in which said air flow makes at least one pass through said coil whereby a first portion of said coil exposed to incoming outside air remains warmer than a second portion of said cooling coil closer to discharge of said air from said array, whereby frost formation occurs on said second portion of said coil.

3. The system of claim 2 in which said air flow system comprises a damper system for reversing air flow through said array whereby said second portion of said coil receiver warmer incoming air resulting in a decrease in frost formation thereon.

4. The system of claim 3 in which said damper system comprises one or more air dampers.

5. The system of claim 4 having means for determining a frost threshold requiring reversal of air flow to remove frost formation.

6. The system of claim 1 having two passes of said air flow through said array.

7. A low temperature cooling and dehumidification system comprising:
    a containment enclosing a cooling coil array comprising a coil through which flows a coolant and an air-to-air heat exchanger located above said array;
    an air flow system for directing incoming air through said heat exchanger in a first pass, through said array in which cooling of said air occurs and then through said heat exchanger in a second pass for heat exchange between the two passes of air therethrough, whereby condensate is formed and collects in a bottom of said containment;
    whereby air flow continues during defrosting; and
    whereby cooling coil airflow is reversed, and the coldest section of the cooling coil becomes the warmest, thereby promoting defrost, while also keeping the energy, given up by melting frost, in the airstream, thereby providing an energy efficient means for defrosting while not interrupting operation; and
    means for removal of frost formation on said coil in the cooling coil array by reversing direction of air flow through said array without interrupting cooling and dehumidification or changing direction of flow into and out of said containment.

8. The temperature cooling and dehumidification system of claim 7 in which said frost formation removal means comprises a damper system located within or adjacent said containment for reversing direction of air flow in said primary air flow system through said array.

9. The temperature cooling and dehumidification system of claim 8 in which said containment includes an airflow partition dividing said containment into a first side and a second side in which air flow moves in one direction in said first side and in an opposite direction in said second side, whereby directions of flow are reversed when direction of air flow through said containment is reversed.

10. The temperature cooling and dehumidification system of claim 9 in which during normal flow of air, said air enters said containment on said first side where entry to said cooling coil array occurs and exits said containment from said second side of said containment.

11. The temperature cooling and dehumidification system of claim 10 in which each side has an air damper for controlling of primary air flow through said containment.

12. The temperature cooling and dehumidification system of claim 10 in which a single air damper controls primary air flow through both sides of said containment.

13. The temperature cooling and dehumidification system of claim 10 in which a plenum within said containment is located underneath said cooling coil array for collection of generated condensate, said collection of generated condensate being grey water ready for reuse.

14. A method of limiting frost formation in a low temperature cooling and dehumidification system comprising the steps of:
    passing ambient air through a cooling coil array comprising a coil through which flows a coolant for cooling and dehumidifying said ambient air whereby a condensate is formed on an outside surface of said coil, said condensate freezing to form a frost formation on a coldest portion of said coil;

periodically removing the frost formation on said coil by reversing direction of air flow through said array, said reversal of air flow recurring without interrupting cooling and dehumidification or changing direction of flow into and out of said cooling and dehumidification system;

whereby air flow continues during defrosting; and whereby cooling coil airflow is reversed, and the coldest section of the cooling coil becomes the warmest, thereby promoting defrost, while also keeping the energy, given up by melting frost, in the airstream, thereby providing an energy efficient means for defrosting while not interrupting operation; and collecting generated condensate in a plenum under said array.

15. The method of claim 14 in which an air damper is system is employed to control the direction of ambient air flow through said cooling and dehumidification system.

16. A method of limiting frost formation in a low temperature cooling and dehumidification system comprising the steps of:

passing ambient air through a containment in which there is a cooling coil array comprising a coil through which flows a coolant for cooling and dehumidifying said ambient air whereby a condensate is formed on an outside surface of said coil, said condensate freezing to form a frost formation on a coldest portion of said coil;

said ambient air making a first pass through an air-to-air heat exchanger located within said containment located above said coil array and a second pass through said heat exchanger after leaving said coil array;

periodically removing the frost formation on said coil by reversing direction of air flow through said containment, said reversal of air flow recurring without interrupting cooling and dehumidification or changing direction of flow into and out of said containment;

whereby air flow continues during defrosting; and whereby cooling coil airflow is reversed, and the coldest section of the cooling coil becomes the warmest, thereby promoting defrost, while also keeping the energy, given up by melting frost, in the airstream, thereby providing an energy efficient means for defrosting while not interrupting operation; and collecting generated condensate in a plenum under said array within said containment.

17. The method of claim 16 in which an air damper is system is employed to control the direction of ambient air flow through said containment.

18. The low temperature cooling and dehumidification system of claim 1 further comprising a heating coil associated with the inlet air to raise the inlet air temperature to increase the rate of defrosting.

19. The low temperature cooling and dehumidification system of claim 7 further comprising a heating coil associated with the inlet air to raise the inlet air temperature to increase the rate of defrosting.

20. The method of limiting frost formation in a low temperature cooling and dehumidification system of claim 14 further comprising the step of providing a heating coil associated with the inlet air to raise the inlet air temperature to increase the rate of defrosting.

21. The method of limiting frost formation in a low temperature cooling and dehumidification system of claim 16 further comprising the step of providing a heating coil associated with the inlet air to raise the inlet air temperature to increase the rate of defrosting.

* * * * *